United States Patent [19]

Yamada et al.

[11] Patent Number: 5,146,214
[45] Date of Patent: Sep. 8, 1992

[54] PAGING SIGNAL CONTROL SYSTEM WITH REDUCED POWER CONSUMPTION IN A MOBILE COMMUNICATION SYSTEM

[75] Inventors: Tomoyuki Yamada; Seizo Onoe, both of Kanagawa, Japan

[73] Assignee: Nippon Telegraph and Telephone Corporation, Tokyo, Japan

[21] Appl. No.: 611,571

[22] Filed: Nov. 13, 1990

[30] Foreign Application Priority Data

Nov. 13, 1989 [JP] Japan .................. 1-292164

[51] Int. Cl.⁵ ............................ H04Q 7/00
[52] U.S. Cl. ............... 340/825.03; 340/825.44; 455/56.1
[58] Field of Search ............... 340/825.03, 825.47, 340/825.44, 825.51, 311.1, 825.04; 455/49, 53, 54, 56, 58, 34, 343, 32, 228; 370/95.1, 95.2, 95.3

[56] References Cited

U.S. PATENT DOCUMENTS

| | | | |
|---|---|---|---|
| 4,398,192 | 8/1983 | Moore et al. | 340/825.44 |
| 4,734,694 | 3/1988 | Umetsu | 340/825.47 |
| 4,831,373 | 5/1989 | Hess | 340/825.44 |
| 4,845,491 | 7/1989 | Fascenda et al. | 340/825.44 |
| 4,926,496 | 5/1990 | Cole et al. | 455/54 |
| 4,959,648 | 9/1990 | Breeden et al. | 340/825.44 |

FOREIGN PATENT DOCUMENTS 60-52133  3/1985  Japan .
63-227134  9/1988  Japan .

Primary Examiner—Donald J. Yusko
Assistant Examiner—Edwin C. Holloway, III
Attorney, Agent, or Firm—Nikaido, Marmelstein, Murray & Oram

[57] ABSTRACT

Mobile stations are classified into a first grouped station which is portable, and a second ungrouped station which is carried by a vehicle. A grouped station receives a part of the time slots of a paging channel relating to the group which the station belongs, and an ungrouped station receives all the time slots of a paging channel. A base station having a plurality of buffer cells (1−n) relating to each group, stores the queue of the paging signals in each buffer cell, and broadcasts the content of each buffer cell in the related time slot of the paging channel. A paging signal for a grouped station is stored in the related buffer cell, and a paging signal for an ungrouped station is stored in the buffer cell which has the shortest queue. Thus, a grouped station saves battery power because of intermittently receiving a paging signal, while keeping a short waiting time for an ungrouped station, and small call loss ratio.

3 Claims, 4 Drawing Sheets

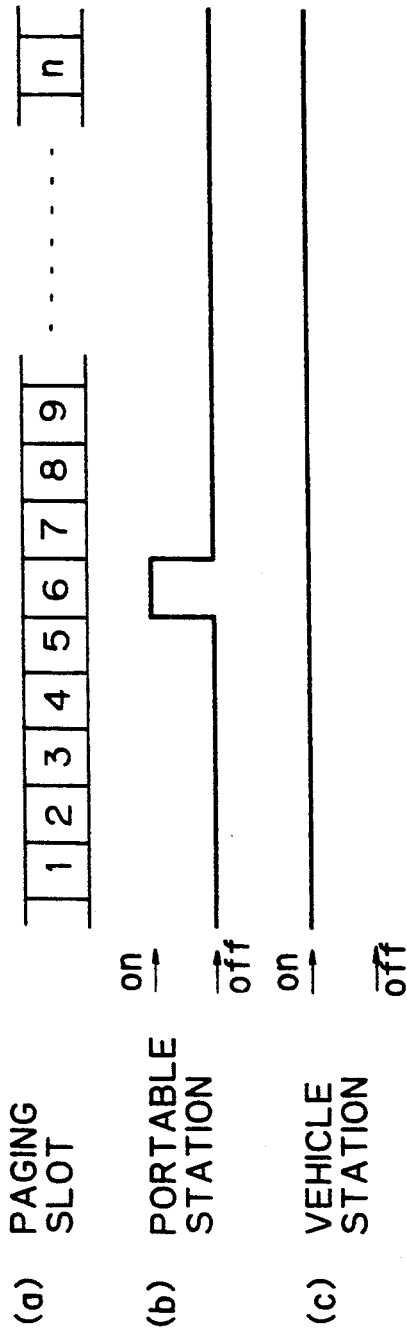

PAGING SIGNAL CONTROL SYSTEM WITH REDUCED POWER CONSUMPTION IN A MOBILE COMMUNICATION SYSTEM

BACKGROUND OF THE INVENTION

The present invention relates to a paging system in a mobile communication system for service of mobile stations which include both vehicle equipment and portable equipment, in particular, relates to such a system which reduces power consumption of portable equipment.

In a mobile communication system, power consumption of a mobile station must be as small as possible so that a battery in a mobile station operates as long as possible in every charge operation. It should be noted that a mobile station consumes some power even in the waiting state (i.e. standby mode).

Conventionally, an intermittent receiver system has been used in a pocket bell system for reducing power consumption as shown in JP patent laid open publication 60-52133 dated Mar. 26, 1985, and in JP patent laid open publication 63-227134 dated Sep. 21, 1988. In that system, mobile stations are classified into a plurality of groups so that each group includes a plurality of mobile stations. Paging information is broadcast in a time slot which is specific to the related group, and the mobile stations in the group receives the time slot signal. Since the power consumption when the station does not receive the time slot is very small, the power is essentially supplied intermittently, and the charged time or the life time of a battery is long. In that system, a buffer memory is provided to store paging calls in each time slot, and the content of the memory is broadcast in the related time slot. A call originated when a related area of the buffer memory is full, is handled as a call loss.

However, a conventional intermittent receiver system has the disadvantage that the call loss largely depends upon the call occurrence, and the call loss is large when compared with that in which no group classification is used.

If we intend to provide the same call loss as that with no group classification, the number of paging slots must be increased, but the increase of the paging slots decreases the efficiency of the paging slots or the paging channels.

Another disadvantage of conventional intermittent receiver system is that both portable equipment which is carried by a person, and vehicle equipment which is carried by a vehicle, are classified into groups, while the latter equipment which is carried by a vehicle has no serious necessity for power saving, or related problems.

SUMMARY OF THE INVENTION

It is an object, therefore, of the present invention to provide an improved paging signal control system by overcoming the disadvantages and limitations of a prior paging signal control system, or interrupt receiver system.

It is also an object of the present invention to provide a paging signal control system which is used in both vehicle equipment and portable equipment, reducing power consumption in portable equipment, and provides high efficiency for paging channels.

The above and other objects are attained by a paging signal control system having a plurality of mobile stations and a plurality of base stations coupled with a communication network. Mobile stations are classified into a first grouped station which receives a part of the time slots in the waiting state, and a second ungrouped station which receives all the time slots in the waiting state. Each mobile station and each base station have information whether the mobile station is a grouped station or an ungrouped station, and the group to which the mobile station belongs. A base station have a plurality of buffer cells each of which is broadcast in the related time slot in paging channel; a paging signal to a grouped station is stored in the related buffer cell, and a paging signal to an ungrouped station is stored in the buffer cell which has the shortest queue. A grouped station receives only a part of time slot relating to itself, and an ungrouped station receives all the time slots.

BRIEF DESCRIPTION OF THE DRAWINGS

The foregoing and other objects, features, and attendant advantages of the present invention will be appreciated as the same become better understood by means of the following description and accompanying drawings wherein;

FIG. 2 is an embodiment of a signal format of a paging signal according to the present invention, FIG. 3 is another embodiment of a signal format of a paging signal according to the present invention.

DESCRIPTION OF THE PREFERRED EMBODIMENTS

Figure 5:
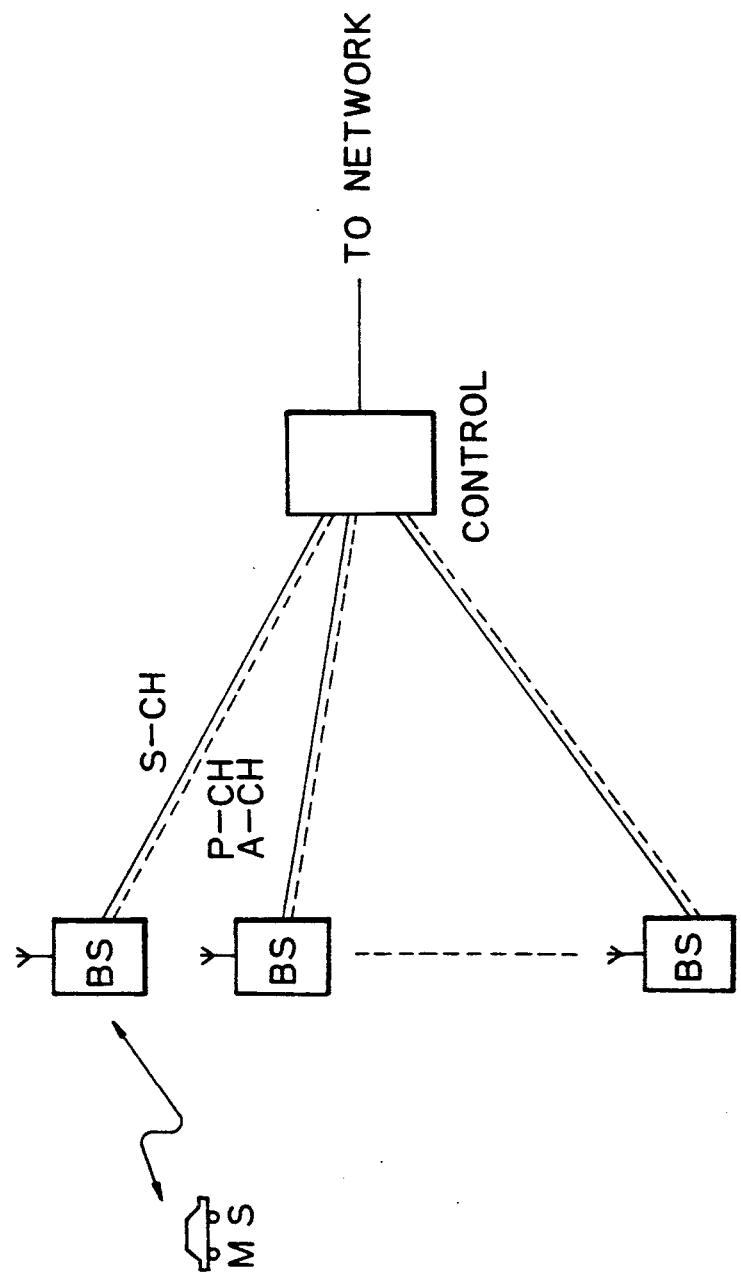
FIG. 5 shows a system diagram of a mobile communication system in which the present invention is used.

FIG. 5 shows a system diagram of a mobile communication system in which the present invention is used. In the figure, the symbol BS shows a base station which is coupled with a mobile station through a radio channel. A base station BS is coupled with a control station through a P-channel (paging channel for receiving calls to a mobile station), an A-channel (access channel for originating calls from a mobile station), and an S-channel (speech channel). The control station is coupled with a network. It is supposed that a control station has a home memory which stores information relating to each mobile station.

Figure 1:
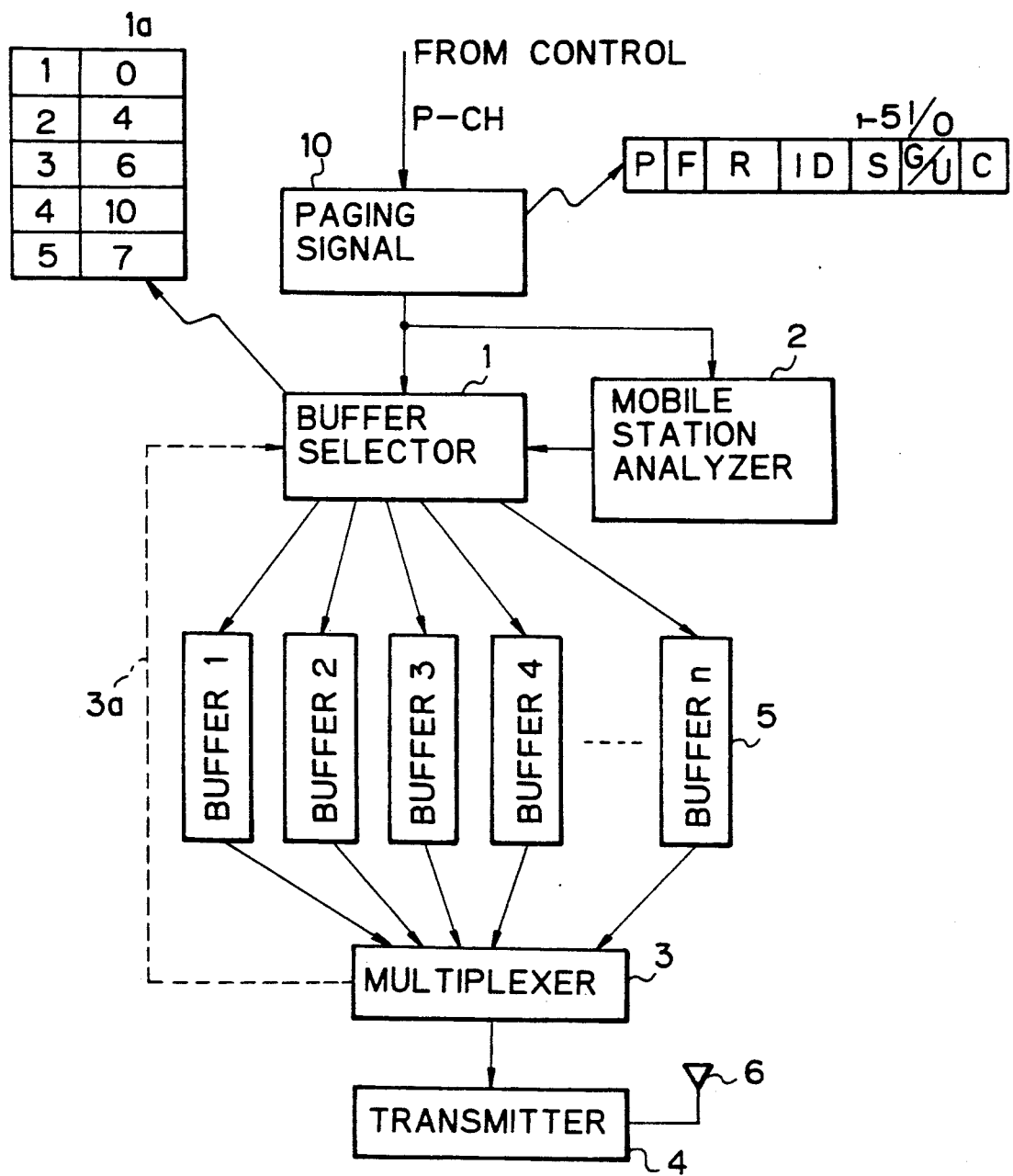
FIG. 1 is a block diagram of a main portion of a base station for implementing the present paging signal control system.

FIG. 1 shows a block diagram of a main portion of a base station according to the present invention. It should be appreciated that a mobile communication system has S-channel for speech communication, P-channel for paging control in a receiving phase, and A-channel for access control. FIG. 1 relates the P-channel.

In FIG. 1, a buffer selector 1 selects one of the buffer cells 1 through n when the base station receives a paging signal 10 so that the paging signal is stored in the selected buffer cell. The signal format of a paging signal has a preamble P, a frame synchronization bit F, a paging signal indicator R, an identification of a mobile station ID, a group number S of a mobile station, a flag G/U showing whether the mobile station is a grouped station or an ungrouped station, and a check bit C. A flag G/U is 1 or 0. The group number S in the present, embodiment is in the range from 1 to 5.

A mobile station analyzer analyzes whether the mobile station to be paged is a grouped station or an ungrouped station, and when it is a grouped station the group or the time slot which the mobile station belongs to is provided. The paging signal 10 is used for the mobile station analysis. The information of the paging signal 10, which the mobile station analyzer 2 uses, is stored in a home memory (not shown) in a mobile communication network. The analyzed result by the mobile station analyzer 2 is supplied to the buffer selector 1 for the selection operation.

When a mobile station to be paged is an ungrouped station, the paging signal is stored in the buffer cell which has the shortest queue in all the buffer cells. It is preferable that a table 1a is provided in a buffer selector 1, showing the length of the queue in each buffer cell. In the embodiment, the buffer cells 1-5 have the queue 0, 4, 6, 10 and 7. Therefore, the new paging signal for an ungrouped station is stored in the buffer cell 1 which has the shortest queue (length 0).

A mobile station may either belong to a fixed group, or a variable group depending upon a mobile visited area. In the latter case, the necessary information for the operation of the mobile station analyzer 2 is obtained by using the ID (identification) of the mobile station, and a dictionary in a home memory (not shown).

The buffer cells 5 (buffer cell 1 through n) relate to each time slot of a paging channel. The output of the buffer cells 5 are multiplexed in the multiplexer 3 so that the information in each buffer cell is inserted in the related time slot. The multiplexed paging signal is transmitted through a transmitter 4 and an antenna 6.

When the content of a buffer cell is transmitted, the related area of the table 1a is reset to zero through the control line 3a from the multiplexer 3.

FIG. 2 shows a signal format of a paging signal. The paging slots 1 through n correspond to the buffer cells 1 through n in FIG. 1. The paging signals stored in each buffer cell are transmitted in the related time slot on a first-in-first-out basis.

It is assumed that a portable station which is carried by a person is grouped. When a paging signal to the grouped portable station is received by the base station, the mobile station analyzer 2 advises the buffer selector 1 the buffer cell which the portable station belongs to, and the paging signal thus received is stored in the buffer cell to which the portable station relates. When the buffer cell is full, the new paging signal is handled as a call loss. The content of the buffer cell is broadcast as mentioned above.

A portable station which is carried by a person receives intermittently the paging channel so that only the time slot related to itself is received. When the portable station belongs to the group 6, the receive operation is carried out during the time slot 6 as shown in FIG. 2. It should be appreciated that the time slot 6 which the portable station operates is considerably short, and the power consumption when the station does not receive is very small. Therefore, the power consumption in a portable station is small, and the battery of the portable station operates longer.

It is assumed that a vehicle station which is carried by a vehicle, or a fixed station is an ungrouped station. When a paging signal to the vehicle station reach the base station, the mobile station analyzer 2 recognizes that the station is not grouped, and advises the buffer selector 1 that the station is an ungrouped station. The buffer selector 1 selects one of the buffer cells so that the queue in the selected buffer cell is the shortest in all the buffer cells. When all the buffer cells are full, the receive call is handled as a call loss.

As a modification, the condition of a call loss to a vehicle station call is designed adaptively so that call loss in a grouped station is equal to that of an ungrouped station. For instance, a paging signal is handled as a call loss when the queue in the buffer cell which has the shortest queue is larger than a predetermined value, or when the number of buffer cells which have the queue shorter than the predetermined value is smaller than a predetermined value.

Further, it may be possible to move a paging signal from a vehicle station from a first buffer cell to another buffer cell when the queue in each buffer cell changes during the stay of the paging signal in the first buffer cell. In that case, no movement of the paging signal is effected when the queue in the second buffer cell is larger than a predetermined value so that the wait time of the paging signal does not exceed a predetermined value.

A vehicle station constantly receives paging signals as shown in FIG. 2(c). As the vehicle station has a large battery, no consideration for power saving is necessary.

FIG. 3 shows a modification of a paging channel according to the present invention, in which it is supposed that a plurality of paging channels 1 through 3 are provided. The use of a plurality of paging channels is useful when a number of subscribers is increased. When the number of subscribers is small, a single paging channel is used, and when the number of subscribers increases, the number of paging channels is also increased. FIG. 3 is the embodiment that there are three paging channels. In that case, a portable station which belongs to, for instance, group 10, receives only the time slot 10 in the first paging channel. On the other hand, a vehicle station is classified based upon the paging channels. When the vehicle station belongs to the first paging channel, it receives the first paging channel which includes the time slots 1, 4, 7, 10, 13, et al. Similarly, another vehicle station which belongs to the second paging channel receives the time slots 2, 5, 8, 11, 14, 17 et al. Thus, it should be appreciated that vehicle stations are grouped in a different manner from the classification of portable stations.

The present invention has the effect that the call loss ratio depends less upon the dispersion of an occurrence interval of a call, as compared to the prior art which groups all the mobile stations. As the vehicle equipment receives all the slots, and the portable equipment receives only the related slot, the ratio of the received slot to all the time slots is the same as that of the prior art. Therefore, the present invention can reduce the power consumption of a portable station while keeping traffic intensity for each slot large, and keeping waiting time and call loss ratio constant.

Figure 4:
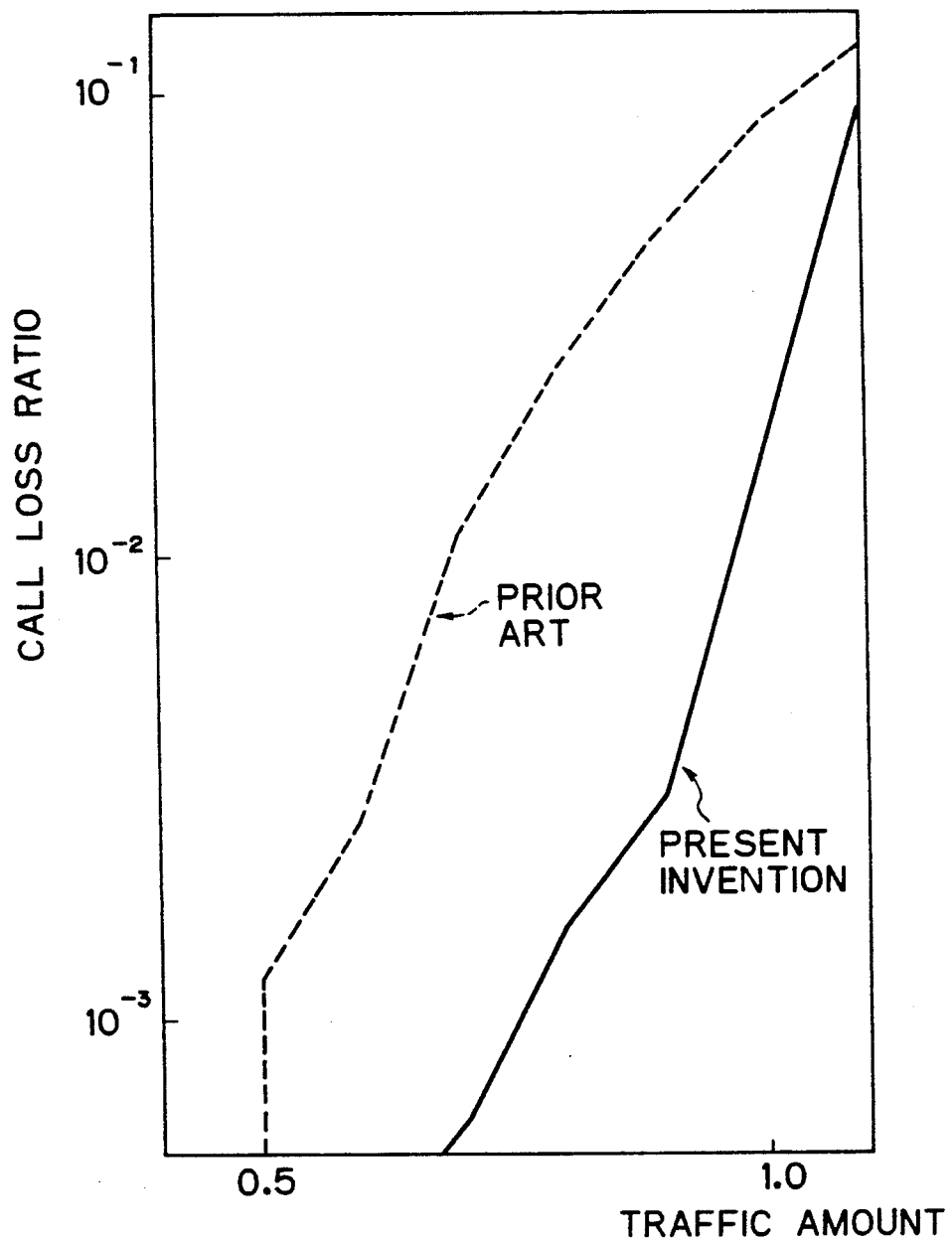
FIG. 4 shows curves of the call loss ratio of the present invention and a prior art.

FIG. 4 shows the simulation curves of the present invention, in which portable stations are classified into 20 groups, the vehicle stations occupy 75% of all the mobile stations, and the number of buffer cells is 5. The horizontal axis in FIG. 4 shows traffic amount, and the vertical axis shows call loss ratio. The solid curve shows the characteristics of the present invention, and the dotted curve shows the characteristics of the prior art.

It should be appreciated in FIG. 4 that the traffic amount for the predetermined call loss ratio of the present invention is larger than that of the prior art. For instance, when the call loss ratio is $10^{-3}$, the traffic amount of the present invention is 1.5 times as large as the prior art. It should be appreciated that the large traffic amount means that a large number of mobile stations may be occupied in a predetermined number of receiver time slots, and/or a number of control channels may be reduced.

Therefore, the present invention may reduce the power consumption of portable equipment, while increasing the efficiency of a control channel under the predetermined traffic condition and communication quality.

From the foregoing, it will now be apparent that a new and improved paging control system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A paging control system in a mobile communication system comprising:

a communication network;

a plurality of mobile stations; and a plurality of base stations coupled with said communication network, said plurality of base stations each having a transmitter means and a plurality of buffer cells, content of each of said buffer cells is transmitted by said transmitter means in related time slots in a paging channel, said paging channel having a plurality of time slots therein, said plurality of mobile stations classified by said communication network into first grouped stations having means which receive only said time slots relating to itself while in a standby mode, and second ungrouped stations having means which receive all the time slots in the standby mode, each mobile station and each base station having means for storing information about whether the mobile station is said first grouped station or said second ungrouped station, and the group to which the mobile station belongs, and each base station having buffer selector means for storing a paging signal to said first grouped station in a related buffer cell, and for storing said paging signal to said second ungrouped station in the buffer cell which has a shortest queue.

2. A paging control system in a mobile communication system according to claim 1, wherein a plurality of paging channels are provided, and an ungrouped station receives all the time slots of one of the paging channels.

3. A paging system in a mobile communication system according to claim 1, wherein each base station has a table storing a length of the queue in each buffer cell.

* * * * *